United States Patent
Yang et al.

(10) Patent No.: US 7,486,851 B2
(45) Date of Patent: Feb. 3, 2009

(54) TUNABLE SINGLE-CHANNEL DISPERSION COMPENSATOR FOR HIGH-SPEED OPTICAL SYSTEMS

(75) Inventors: Di Yang, Fremont, CA (US); Giovanni Barbarossa, Saratoga, CA (US); Wei Chen, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 38 days.

(21) Appl. No.: 11/115,531

(22) Filed: Apr. 27, 2005

(65) Prior Publication Data
US 2006/0245690 A1 Nov. 2, 2006

(51) Int. Cl.
*G02B 6/00* (2006.01)
(52) U.S. Cl. .................................................... 385/27
(58) Field of Classification Search ................ None
See application file for complete search history.

(56) References Cited
U.S. PATENT DOCUMENTS 6,356,684 B1 * 3/2002 Patterson et al. ............ 385/37
6,724,482 B2 * 4/2004 Wu ............................ 356/450

* cited by examiner

*Primary Examiner*—Sung H Pak
*Assistant Examiner*—Hoang Tran
(74) *Attorney, Agent, or Firm*—Patterson & Sheridan, LLP

(57) ABSTRACT

One embodiment of the present invention includes a plurality of first optical elements and a second optical element optically coupled to one another in cascaded fashion. Each first optical element has a group delay response characterized by a first period such that only one group delay peak occurs within a first channel. By contrast, the second optical element has a group delay response characterized by a second period, which is less than the first period, such that more than one group delay peak occurs within the first channel. The preferred embodiment uses cascaded GT etalons to provide the desired group delay responses. One advantage of the present invention is that the passband of the dispersion compensator is increased relative to prior art designs without increasing insertion losses. Alternatively, the same passband common in prior art designs may be achieved with fewer GT etalons, thereby reducing insertion losses.

22 Claims, 5 Drawing Sheets

TUNABLE SINGLE-CHANNEL DISPERSION COMPENSATOR FOR HIGH-SPEED OPTICAL SYSTEMS

BACKGROUND OF THE INVENTION

1. Field of the Invention

The present invention relates generally to the field of fiber optic networks and more specifically to a tunable, single-channel dispersion compensator for high-speed optical systems.

2. Description of the Related Art

Fiber optic communication systems use wavelength division multiplexing (WDM) to transfer large amounts of data at high speeds. In order to use WDM, channels are specified within a wavelength band. For example, it is generally accepted that the C-band begins at 1530 nm and extends to 1565 nm, and each channel in the C-band is approximately 0.8 nm wide and corresponds to a channel spacing of 100 GHz. The International Telecommunications Union (ITU) sets the standards for channel spacing, channel width and other communication band parameters for this and other optical communication bands.

Lasers that transmit data on optical media, such as optical fibers, provide a narrow spectrum of light (i.e., a light pulse) that includes many wavelengths. Chromatic dispersion is a variation in the velocity of this light according to wavelength. Among other things, this variation in velocity causes the light pulses of an optical signal to broaden as they travel through the optical media. This phenomenon, known as "pulse spreading," can cause increased bit error rates if the light pulses spread to a point where they begin to overlap with one another.

Chromatic dispersion is particularly problematic in high-speed optical systems because the light pulses associated with higher bandwidths have broader wavelength spectra, resulting in relatively more pulse spreading, and the light pulses typically are narrower and transmitted closer together. The combination of these factors creates a system more susceptible to light pulse overlap and increased bit error rates.

As is also known, chromatic dispersion is the rate of change of the group delay response of the light pulses of an optical signal as a function of wavelength. Thus, one approach to compensating for chromatic dispersion involves passing the optical signal through a dispersion compensator that exhibits a rate of change of the group delay response as a function of wavelength opposite to that caused by the optical medium.

For example, U.S. Pat. No. 6,724,482 presents a dispersion compensator that includes a series of cascaded Gires-Tournois interferometers (i.e., GT etalons). Each GT etalon in the dispersion compensator has an individual group delay response. The group delay response of the dispersion compensator (hereinafter referred to as the "aggregate group delay response") is the summation of the individual group delay responses of each of the cascaded GT etalons. The disclosed dispersion compensator is designed such that the aggregate group delay response across a channel has a rate of change as a function of wavelength opposite to that caused the optical medium, thereby compensating for the chromatic dispersion within a single channel of a multi-channel WDM communication system.

In addition, a GT etalon has a periodic group delay response that repeats as a function of wavelength. The free-spectral-range (FSR) is a device parameter of a GT etalon that determines, among other things, the period of the group delay response. Based on these principles, U.S. Pat. No. 6,724,482 also teaches that by designing each GT etalon to have an FSR that aligns with the ITU's channel spacing scheme, the disclosed dispersion compensator can provide dispersion compensation across several channels simultaneously. For example, in a multi-channel WDM communication system having a 100 GHz channel spacing, if the dispersion compensator includes only GT etalons having an FSR of 100 GHz, then the dispersion compensator will provide the same aggregate group delay response, and therefore dispersion compensation across each channel of the system.

One drawback of this type of dispersion compensator is that the passband is limited by the relatively high insertion losses associated with each GT etalon stage. More specifically, in order to extend the passband of the dispersion compensator, more GT etalons must be used. However, the additional GT etalons increase the total insertion losses across the dispersion compensator, which is undesirable. Thus, to keep the total insertion losses at an acceptable level, only a limited number of GT etalons can be used in the dispersion compensator. Limiting the number of GT etalons, however, results in a passband that is not optimized for high-speed optical systems, such as 40 Gb/s per channel optical systems.

As the foregoing illustrates, what is needed in the art is a dispersion compensator with an increased passband for high-speed optical system applications that does not introduce increased insertion losses.

SUMMARY OF THE INVENTION

A tunable, single-channel dispersion compensator, according to one embodiment of the present invention, includes a plurality of first optical elements and a second optical element optically coupled to one another in cascaded fashion. Each first optical element has a group delay response characterized by a first period such that only one group delay peak occurs within a first channel. By contrast, the second optical element has a group delay response characterized by a second period, which is less than the first period, such that more than one group delay peak occurs within the first channel.

One advantage of the disclosed dispersion compensator is that the passband of the dispersion compensator is increased relative to prior art designs without increasing insertion losses. Alternatively, the same passband common in prior art designs may be achieved with fewer optical elements, thereby reducing insertion losses.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
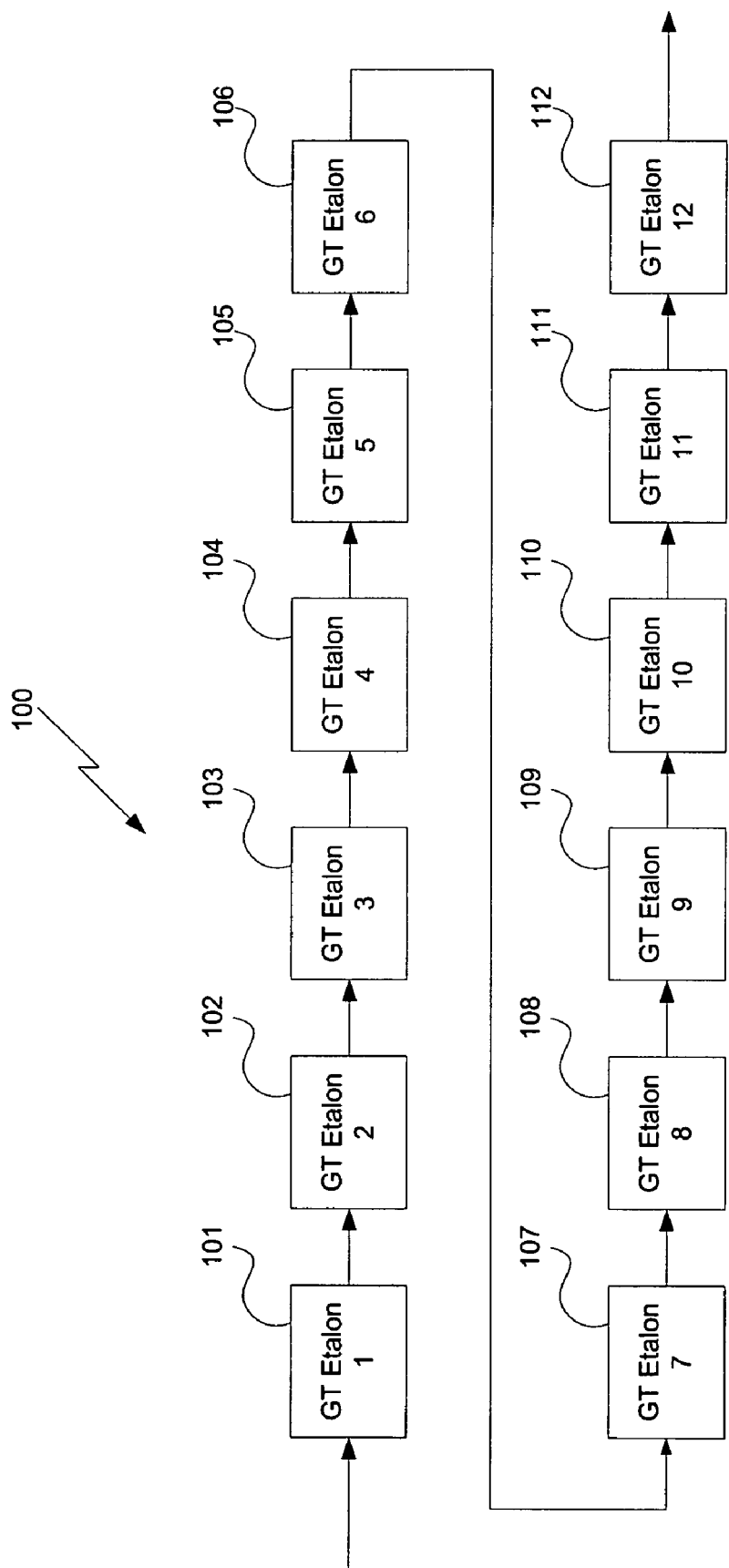
FIG. 1 is a conceptual diagram illustrating a dispersion compensator, according to one embodiment of the invention.

FIG. 1 is a conceptual diagram illustrating a dispersion compensator 100, according to one embodiment of the invention. The dispersion compensator 100 is realized by sequentially cascading a plurality of GT etalons and, as shown, includes GT etalons 101, 102, 103, 104, 105, 106, 107, 108, 109, 110, 111 and 112. In alternative embodiments, the dispersion compensator 100 may include more or less than 12 GT etalons. Each GT etalon has an associated group delay response. As is well-known, the aggregate group delay response of the dispersion compensator 100 is the summation of the individual group delay responses of the GT etalons 101, 102, 103, 104, 105, 106, 107, 108, 109, 110, 111 and 112.

As will be described in further detail below in FIGS. 2 and 3, the passband of the dispersion compensator 100 can be increased without increasing insertion losses by including one or more GT etalons in the dispersion compensator 100 that contribute more than one group delay peak within the channel for which dispersion compensation is being provided.

Figure 2:
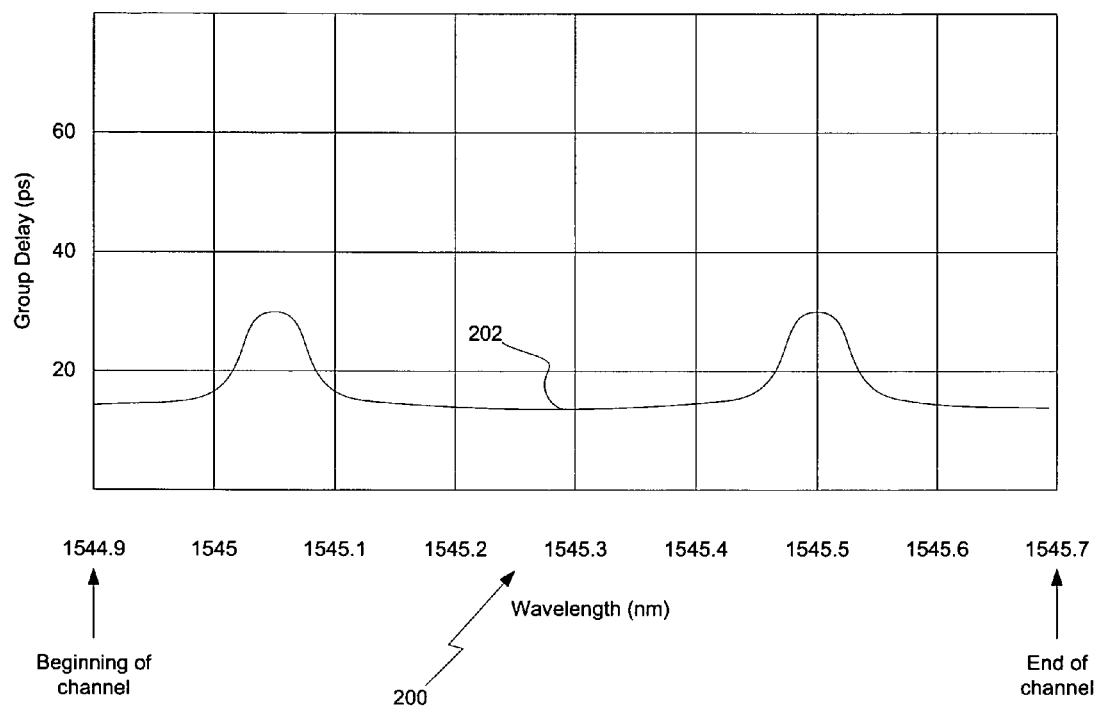
FIG. 2 is a graphical diagram illustrating a group delay response of a GT etalon having an FSR of about 50 GHz, according to one embodiment of the invention.

FIG. 2 is a graphical diagram illustrating a group delay response 202 of a GT etalon having an FSR of about 50 GHz, according to one embodiment of the invention. As shown, a channel 200 in the C-band is approximately 0.8 nm wide. Importantly, the group delay response 202 of the GT etalon is twice periodic in a channel of this size and therefore contributes two group delay peaks within the channel 200. As described in further detail below in FIG. 3, dispersion compensator 100 may be configured to include at least one GT etalon with a group delay response that is twice periodic within the channel 200 and, thus, contributes two group delay peaks to the aggregate group delay response of the dispersion compensator 100. Among other things, such a configuration increases the passband of the dispersion compensator 100, without increasing insertion losses.

Figure 3:
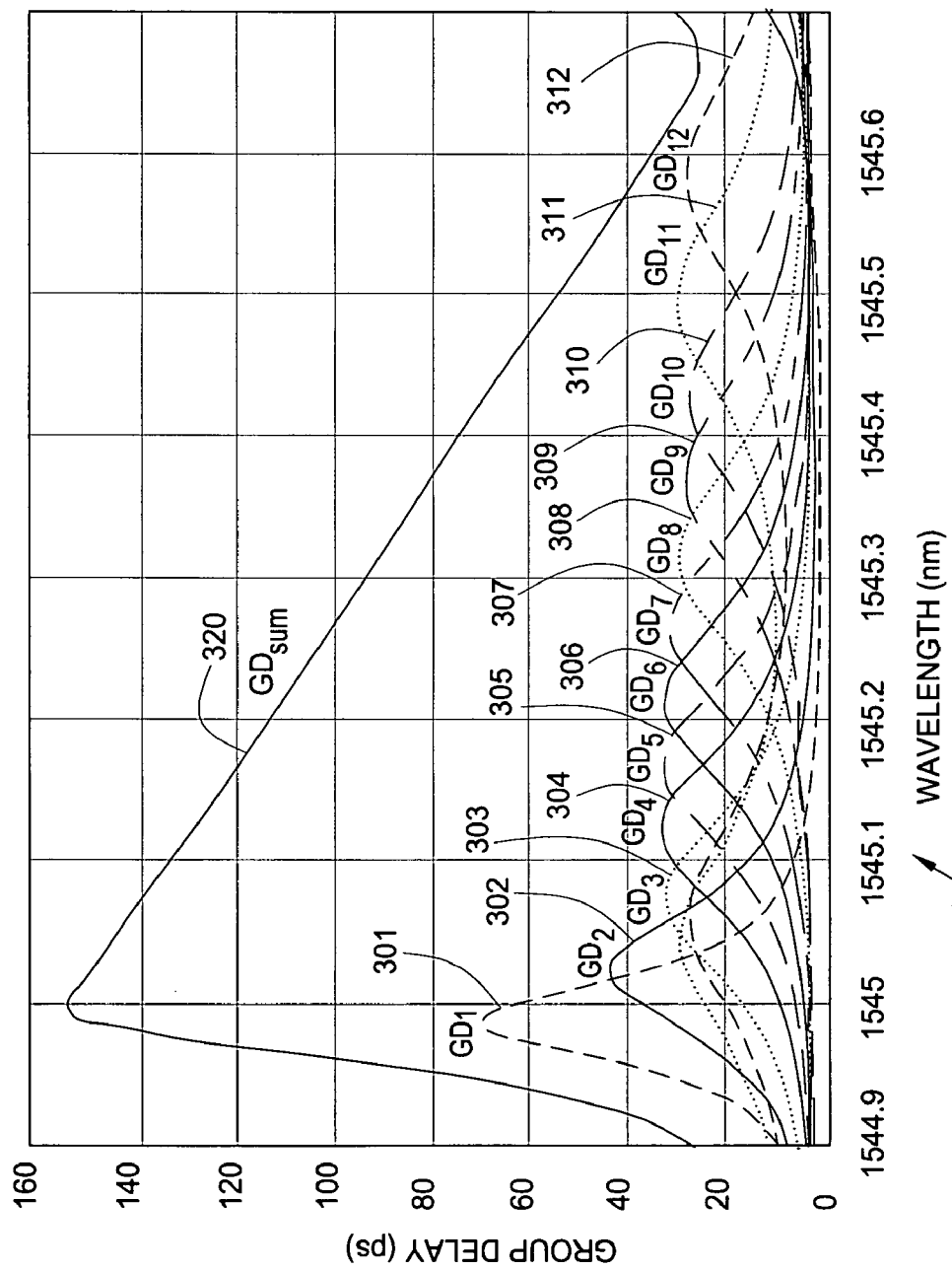
FIG. 3 is a graphical diagram illustrating the aggregate group delay response of the dispersion compensator of FIG. 1, according to one embodiment of the invention.

FIG. 3 is a graphical diagram illustrating an aggregate group delay response 320 of the dispersion compensator 100 of FIG. 1, according to one embodiment of the invention. As shown, the dispersion compensator 100 includes both GT etalons having an FSR of approximately 100 GHz and GT etalons having an FSR of about 50 GHz. The GT etalons 101, 102, 103, 104, 105, 106, 107, 108, 109 and 110 have FSRs of approximately 100 GHz and therefore contribute one group delay peak within the channel 200, as shown by group delay response curves 301, 302, 303, 304, 305, 306, 307, 308, 309 and 310, respectively. By contrast, GT etalons 111 and 112 have FSRs of about 50 GHz and therefore contribute two group delay peaks within the channel 200, as shown by group delay response curves 311 and 312, respectively. Again, the aggregate group delay response 320 of the dispersion compensator 100 is the summation of the individual group delay responses provided by each GT etalon. Thus, the GT etalons 101, 102, 103, 104, 105, 106, 107, 108, 109, 110, 111 and 112 provide fourteen group delay peaks within the channel, as compared to twelve group delay peaks that are provided when the GT etalons have an FSR of approximately 100 GHz. The two extra group delay peaks provided by GT etalons 111 and 112 advantageously increase the passband of the dispersion compensator 100 relative to that of prior art designs. For example, experiments have shown that a dispersion compensator including twelve GT etalons that contribute twelve group delay peaks to the aggregate group delay response has a passband of 0.58 nm. In contrast, a dispersion compensator including twelve GT etalons that contribute fourteen group delay peaks to the aggregate group delay response has a passband of 0.62 nm, an increase of 0.04 nm.

One advantage of the disclosed dispersion compensator design is that the passband is increased without using more GT etalons. Since the number of GT etalons does not increase, the insertion losses are not increased. Conversely, the dispersion compensator design of FIGS. 2 and 3 may use fewer GT etalons to achieve the same aggregate group delay response of a dispersion compensator that includes only GT etalons having a common FSR. Thus, in such an implementation, the same passband can be achieved using fewer GT etalons, resulting in lower insertion losses.

One consequence of the disclosed design is that if the dispersion compensator 100 includes GT etalons with FSRs that do not align with the ITU channel spacing scheme, then the aggregate group delay response of the dispersion compensator 100, and, hence, the dispersion compensation, is not repeated across each channel in the C-band. For example, in a system with 100 GHz channel spacing, a GT etalon with an FSR smaller than 100 GHz has a group delay response with group delay peaks having varying relative positions within the different channels across the system. Because the relative positions of these group delay peaks change from channel to channel, the summation of the group delay responses of the individual GT etalons of the dispersion compensator 100 also changes from channel to channel. As a result, the dispersion compensator 100 may provide the desired dispersion compensation to only one channel at a time. This phenomenon is described in further detail below in FIG. 4.

Figure 4:
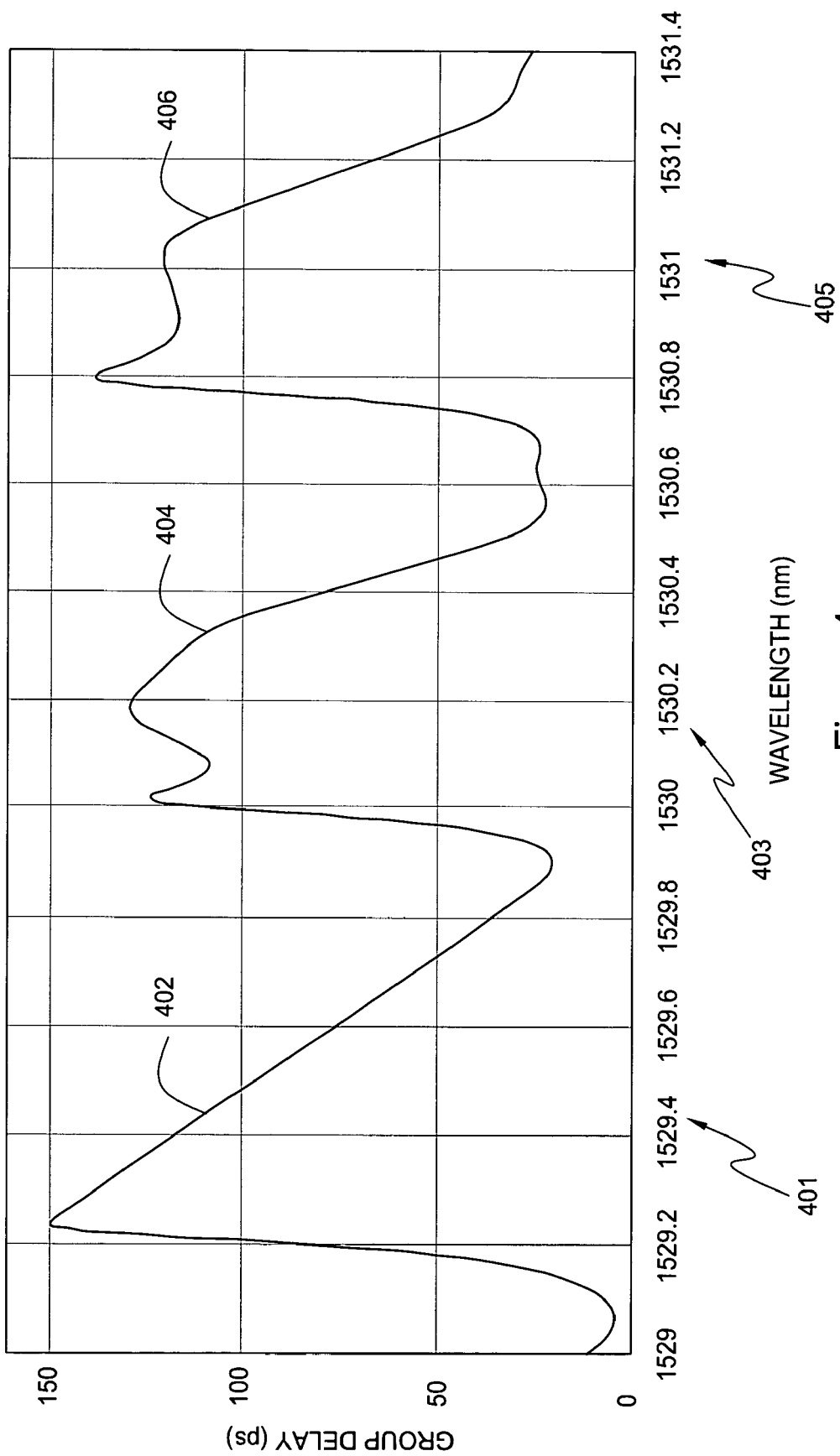
FIG. 4 is a graphical diagram illustrating the aggregate group delay response of the dispersion compensator of FIG. 1 across three channels, according to one embodiment of the invention.

FIG. 4 is a graphical diagram illustrating the aggregate group delay response of the dispersion compensator 100 of FIG. 1 across three channels, according to one embodiment of the invention. As shown, a first channel 401, a second channel 403 and a third channel 405 represent channels in the beginning of the C-band. A curve 402 represents the aggregate group delay response of the dispersion compensator 100 across the first channel 401, a curve 404 represents the aggregate group delay response of the dispersion compensator 100 across the second channel 403, and a curve 406 represents the aggregate group delay response of the dispersion compensator 100 across the third channel 405. Comparing the aggregate group delay response curves 402, 403 and 404 to aggregate group delay response curve 320 of FIG. 3 shows that the dispersion compensator 100 provides the desired aggregate group delay response to the first channel 401, but not to the second channel 403 or the third channel 405. Thus, as previously described herein, the dispersion compensator 100 provides the desired dispersion compensation only to the first channel 401.

Although the dispersion compensator 100 may provide the desired dispersion compensation to only one channel at a time, the dispersion compensator 100 is well-suited for use in high-speed optical systems where only one channel is used at any given time, such as 40 Gb/s optical systems. As described in further detail below in FIG. 5, the dispersion compensator 100 may be advantageously tuned on a channel-by-channel basis to provide the desired dispersion compensation to any channel in a high-speed optical system.

Figure 5:
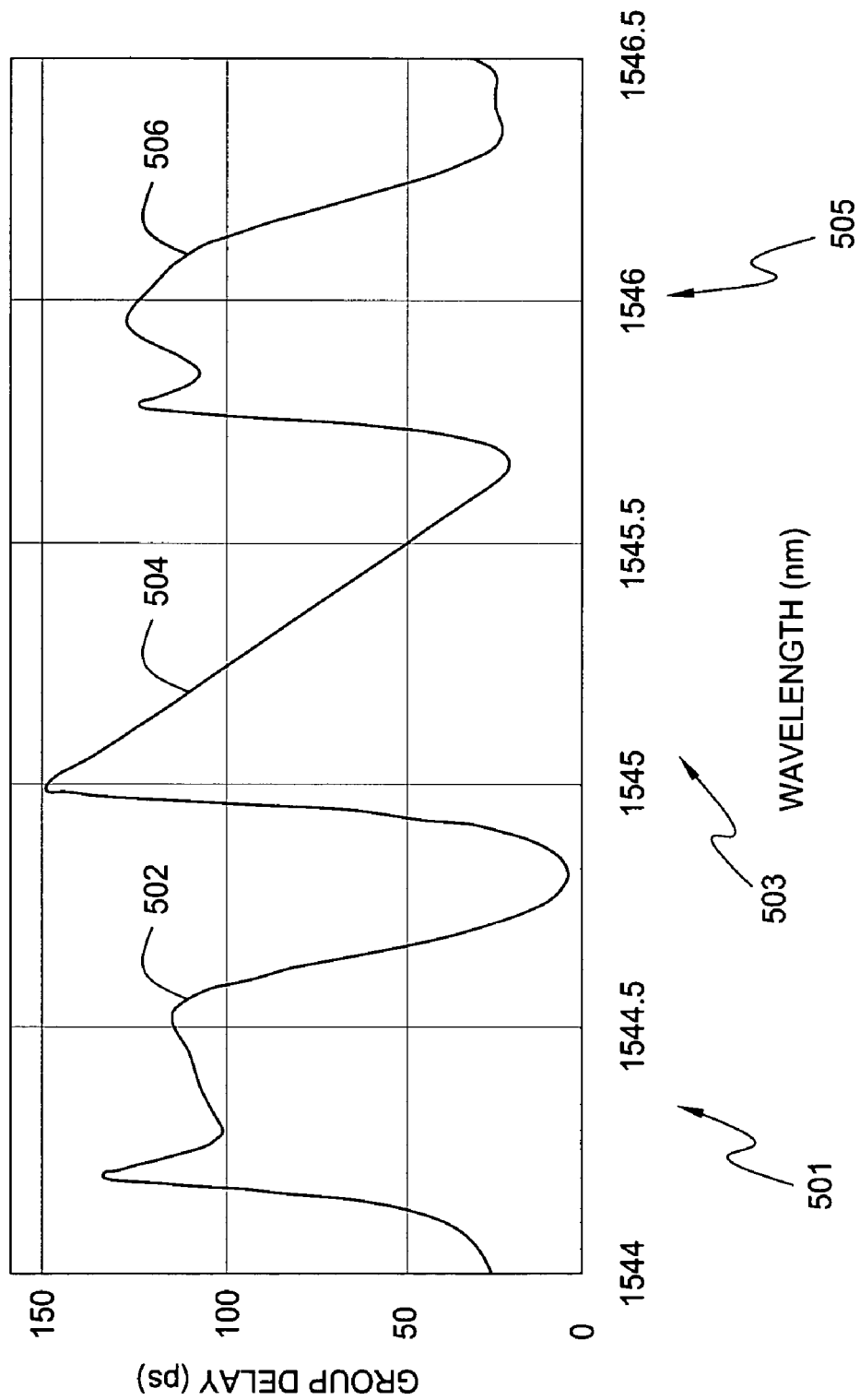
FIG. 5 is a graphical diagram illustrating the aggregate group delay response of the dispersion compensator of FIG. 1 across three channels after tuning, according to one embodiment of the invention.

FIG. 5 is a graphical diagram illustrating the aggregate group delay response of the dispersion compensator 100 of FIG. 1 across three channels after tuning, according to one embodiment of the invention. As shown, a first channel 501, a second channel 503 and a third channel 505 represent channels in the middle of the C-band. A curve 502 represents the aggregate group delay response of the dispersion compensator 100 across the first channel 501, a curve 504 represents the aggregate group delay response of the dispersion compensator 100 across the second channel 503, and curve 506 represents the aggregate group delay response of the dispersion compensator 100 across the third channel 505. Again, comparing the aggregate group delay response curves 502, 504 and 506 to aggregate group delay response curve 320 of FIG. 3 shows that the dispersion compensator 100 provides the desired aggregate group delay response only to the second channel 503, but not to the first channel 501 and the third channel 505. Further, a comparison of FIGS. 4 and 5 shows that the dispersion compensator 100 has been tuned to produce the desired dispersion compensation across the channel 503, whereas, the dispersion compensator 100 initially provided the desired dispersion compensation across the channel 402.

Such tuning may be achieved by modifying some or all of the individual group delay responses of the GT etalons 101, 102, 103, 104, 105, 106, 107, 108, 109, 110, 111, and 112 on an as-needed basis. As is well-known, the FSR (and, thus, the group delay response) of a GT etalon may be modified by varying the temperature of the GT etalon. Thus, by altering the temperatures of the GT etalons in the dispersion compensator 100 in an appropriate fashion, the individual group delay responses of those GT etalons may be modified to produce the aggregate group delay response curve 504 across the second channel 503 of FIG. 5 from the aggregate group delay response curve 402 across the first channel 401 of FIG. 4. Temperature control is only one means by which the group delay response of a GT etalon may be modified. Persons skilled in the art will recognize that, in alternative embodiments, the individual group delay responses of the GT etalons may be modified by other means such as air pressure modulation, piezo tuning, or the like.

In addition to the foregoing, although the dispersion compensator 100 is described in FIGS. 2 and 3 as including GT etalons with an FSR of about 50 GHz, alternative embodiments may include any GT etalon with a periodic group delay response that contributes more than one group delay peak within the channel for which dispersion compensation is being provided. Further, in other embodiments, the GT etalons may be replaced with waveguides, Bragg gratings or other optical devices that are mathematically equivalent to a GT etalon and display the described periodic group delay responses. Finally, the dispersion compensator 100 may be tuned to provide dispersion compensation to any channel. Therefore, in yet other alternative embodiments, the dispersion compensator 100 may be configured to operate on other optical communication bands, such as the L-band and the S-band, that have 100 GHz channel spacing or otherwise.

While the foregoing is directed to embodiments of the present invention, other and further embodiments of the invention may be devised without departing from the basic scope thereof, and the scope thereof is determined by the claims that follow.

We claim:

1. A method of compensating for dispersion with a plurality of first optical elements and a second optical element, the method comprising:

generating a first associated periodic group delay response characterized by a first period that results in only one group delay peak occurring within a first channel by utilizing the plurality of first optical elements, wherein each first optical element has the associated periodic group delay response; and generating a second associated periodic group delay response characterized by a second period, which is less than the first period and results in more than one group delay peak occurring within the first channel by utilizing the second optical element, wherein the second optical element has the associated periodic group delay response and wherein the second optical element is coupled to the plurality of first optical elements in a cascaded fashion.

2. The method of claim 1, further comprising tuning one of the first optical elements to provide a desired dispersion compensation across a second channel.

3. The method of claim 1, further comprising tuning the second optical element to provide a desired dispersion compensation across a second channel.

4. The method of claim 1, further comprising tuning one or more of the first optical elements such that a relative position of the one group delay peak associated with each of the one or more first optical elements within a second channel is substantially the same as an initial relative position of the one group delay peak associated with each of the one or more first optical elements within the first channel.

5. The method of claim 4, wherein each of the one or more first optical elements may be tuned via temperature control.

6. The method of claim 1, further comprising tuning the second optical element so that a relative position of the more than one group delay peak within a second channel is substantially the same as an initial relative position of the more than one group delay peak within the first channel.

7. The method of claim 6, wherein the second optical element may be tuned via temperature control.

8. The method of claim 1, wherein the configuration of the plurality of first optical elements and the second optical element allows for an increased passband without introducing increased insertion losses.

9. The method of claim 1, wherein the first period characterizing the periodic group delay response of each of the first optical elements is substantially equal to a channel spacing defined across a band of wavelengths.

10. The method of claim 9, wherein the channel spacing is approximately 100 GHz.

11. The method of claim 1, further comprising providing a third optical element configured to have an associated periodic group delay response characterized by a third period, which is less than the first period and results in more than one group delay peak occurring within the first channel.

12. The method of claim 11, wherein the first period characterizing the periodic group delay response of each of the first optical elements is approximately 100 GHz.

13. The method of claim 12, wherein the second period characterizing the periodic group delay response of the second optical element is about 50 GHz.

14. The method of claim 1, wherein at least one of the first optical elements comprises a Gires-Tournois interferometer.

15. The method of claim 1, wherein the periodic group delay response associated with the second optical element results in more than one group delay peak occurring within a second channel, and a relative position of the more than one group delay peak within the second channel is different than a relative position of the more than one group delay peak within the first channel.

16. A method of compensating for dispersion with a plurality of first Gires-Tournois interferometers, a second Gires-Tournois interferometer and a third Gires-Tournois interferometer, the method comprising:

generating a first associated periodic group delay response characterized by a first period that results in only one group delay peak occurring within a first channel and only one group delay peak occurring within a second channel, wherein each first Gires-Tournois interferometer has the associated periodic group delay response;

generating a second associated periodic group delay response characterized by a second period, which is less than the first period and results in more than one group delay peak occurring within the first channel and more than one group delay peak occurring within the second channel by using the second Gires-Tournois interferometer; and generating a third associated periodic group delay response characterized by a third period, which is less than the first period and results in more than one group delay peak occurring within the first channel and more than one group delay peak occurring within the second channel by using the third Gires-Tournois interferometer, wherein the first Gires-Tournois interferometers, the second Gires-Tournois interferometer and the third Gires-Tournois interferometer are optically coupled in a cascaded fashion.

17. The method of claim 16, wherein each of the first Gires-Tournois interferometers has a free-spectral-range of approximately 100 GHz.

18. The method of claim 16, further comprising tuning one or more of the first Gires-Tournois interferometers so that a relative position of the one group delay peak associated with each of the one or more first Gires-Tournois interferometers within the second channel is substantially the same as an initial relative position of the one group delay peak associated with each of the one or more first optical elements within the first channel.

19. The method of claim 16, further comprising tuning the second Gires-Tournois interferometer so that a relative position of the more than one group delay peak within the second channel is substantially the same as an initial relative position of the more than one group delay peak within the first channel.

20. The method of claim 16, further comprising tuning the third Gires-Tournois interferometer so that a relative position of the more than one group delay peak within the second channel is substantially the same as an initial relative position of the more than one group delay peak within the first channel.

21. A method of compensating for dispersion, the method comprising:

providing a plurality of first optical elements configured such that each first optical element has a first associated periodic group delay response characterized by a first period that results in only one group delay peak occurring within a first channel; and providing a second optical element configured to have a second associated periodic group delay response characterized by a second period, which is less than the first period and results in more than one group delay peak occurring within the first channel.

22. The method of claim 21, wherein the first optical elements and the second optical element are optically coupled in a cascaded fashion.

* * * * *